United States Patent

Hayashi et al.

[11] Patent Number: 5,329,373
[45] Date of Patent: Jul. 12, 1994

[54] FACSIMILE APPARATUS HAVING ORIGINAL DOCUMENT AND RECORDING MEDIUM CONVEYING SYSTEMS

[75] Inventors: Toshiyuki Hayashi, Yokohama; Toshiyuki Takano, Kawasaki; Hiroshi Ogushi, Shiroi, all of Japan

[73] Assignee: Canon Kabushiki Kaisha, Tokyo, Japan

[21] Appl. No.: 935,418

[22] Filed: Aug. 26, 1992

[30] Foreign Application Priority Data

Aug. 30, 1991 [JP] Japan .................. 3-219829

[51] Int. Cl.$^5$ .................. H04N 1/23; G01D 15/00
[52] U.S. Cl. .................. 358/296; 358/498; 346/145
[58] Field of Search .................. 358/296, 401, 498; 346/134, 145; 400/578, 599, 607, 607.2; 271/8.1

[56] References Cited

U.S. PATENT DOCUMENTS

| | | | |
|---|---|---|---|
| 4,872,026 | 10/1989 | Rasmussen et al. | 346/134 X |
| 4,910,612 | 3/1990 | Yamazaki | 358/498 X |
| 4,914,525 | 4/1990 | Abe et al. | 358/498 |
| 4,969,048 | 11/1990 | Hoshino . | |
| 5,025,326 | 6/1991 | Shimmyo . | |
| 5,038,228 | 8/1991 | Takada | 358/498 |
| 5,095,370 | 3/1992 | Takada et al. | 358/498 X |
| 5,140,438 | 8/1992 | Kurahashi et al. | 358/401 |
| 5,166,707 | 11/1992 | Watanabe et al. | 346/145 X |
| 5,175,583 | 12/1992 | Noh et al. | 346/145 X |

FOREIGN PATENT DOCUMENTS 0447264 9/1991 European Pat. Off. .

*Primary Examiner*—Joseph W. Hartary
*Assistant Examiner*—Eric Frahm
*Attorney, Agent, or Firm*—Fitzpatrick, Cella Harper & Scinto

[57] ABSTRACT

A facsimile apparatus, which includes a recording unit including a serial ink-jet recording head and a replaceable ink cartridge, and can arbitrarily supply one recording sheet to the recording unit when a cut sheet is used as the recording sheet. The apparatus further includes a main body having an outer surface, with the recording unit arranged in a deep portion of the main body, an upper surface lid, which is openably provided on the upper surface of the main body, and allows replacement of the ink cartridge, an original reader arranged in an upper portion of the main body, an original insertion port for an original, which is formed in the upper surface of the main body, a sheet discharge port for a recording sheet, which is formed in the upper surface of the main body, an original discharge port for the original, which is formed in the front surface of the main body, a sheet insertion port for the recording sheet, which is formed in the front surface of the main body, an original convey path for conveying the original from the original insertion port to the original discharge port via the original reader, and a recording sheet convey path for conveying the recording sheet from the sheet insertion port to the sheet discharge port via the recording unit.

12 Claims, 4 Drawing Sheets

FACSIMILE APPARATUS HAVING ORIGINAL DOCUMENT AND RECORDING MEDIUM CONVEYING SYSTEMS

BACKGROUND OF THE INVENTION

In general, a facsimile apparatus is often used in an unattended state such as in the night, and high recording quality, easy maintenance, and low recording cost are required due to a large recording amount.

For this reason, a facsimile apparatus normally uses roll paper as recording paper, and normally adopts a thermal recording system as a recording system.

However, since recent ink-jet recording techniques have remarkably advanced, and recording quality has become very high, some facsimile apparatuses employ a serial ink-jet recording system.

1. Field of the Invention

The present invention relates to a facsimile apparatus which uses a cut paper sheet as recording paper, and adopts serial ink-jet recording means as a recording system.

2. Description of the Related Art

A conventional facsimile apparatus comprising a serial recording type ink-jet recording means has an arrangement, as shown in FIG. 4. As shown in FIG. 4, an operation panel 201 is arranged on the front edge portion of the upper surface of a main body 200. Below the operation panel, an original reader is arranged. The original reader moves an original E in a direction of an arrow A, and reads the original while discharging the original E onto a tray 51 through an opening portion 103 formed in the front side surface of the main body 200. The original reader is constituted by a contact sensor 80 which is brought into direct contact with the original surface of the original E to read an original image, a feed roller 90, and the like.

A serial recording type ink-jet recording apparatus is incorporated below and behind the original reader. The ink-jet recording apparatus is constituted by a carriage 113, which is reciprocally driven by a drive mechanism (not shown) in the upper/lower direction of the sheet surface of the drawings, and an ink cartridge 120 (indicated by a broken line) detachably attached to the carriage 113. The ink-jet recording apparatus performs recording onto a recording sheet S which is fed in a direction of an arrow B.

A plurality of recording sheets S are stacked and stored in a sheet base 60, and are conveyed one by one to a position between a main roller 170 and a sheet guide 180 by a sheet separation mechanism (not shown). The recording sheet is then conveyed step by step in the direction of the arrow B, and is subjected to recording for one line corresponding to a predetermined number of dots. Upon completion of recording for one sheet, the recording sheet is discharged onto a tray 52.

SUMMARY OF THE INVENTION

However, in the conventional ink-jet recording apparatus, the recording sheet S is wound on a substantially half portion of the outer circumferential surface of the main roller 170, and its direction is then reversed to be fed toward the tray 52. For this reason, when a relatively thick recording sheet S having high stiffness is to be conveyed, the load on a paper drive mechanism is increased. As a result, a predetermined step-convey operation is disabled, and a regular recording result cannot be obtained. In addition, one recording sheet cannot be arbitrarily fed to the ink-jet recording apparatus.

Therefore, the present invention has been made in consideration of the above-mentioned problems, and has as its object to provide a facsimile apparatus, which can prevent an increase in load on a paper drive mechanism even when a relatively thick recording sheet S is conveyed, can arbitrarily feed one recording sheet to an ink-jet recording apparatus, and allows easy replacement of a detachable ink cartridge.

In order to achieve the above object, according to the present invention, a facsimile apparatus comprises a main body forming an outer surface of the facsimile apparatus, a recording unit which adopts serial recording type ink-jet recording means, and being arranged in a deep portion of the main body, an original reader arranged in an upper portion of the main body, an original insertion port for an original, which port is formed in an upper surface of the main body, a sheet discharge port for a recording sheet, which port is formed in the upper surface of the main body, an original discharge port for the original, which port is formed in a front surface of the main body, a sheet insertion port for the recording sheet, which port is formed in the front surface of the main body, an original convey path for conveying the original from the original insertion port to the original discharge port through the original reader, and a recording sheet convey path for conveying the recording sheet from the sheet insertion port to the sheet discharge port through the recording unit. Since a recording sheet is conveyed from the sheet insertion port on the front surface of the main body toward the sheet discharge port on the upper surface of the main body, the original convey path and the recording sheet convey path can be rendered compact. In addition, the load on a paper drive mechanism can be prevented from being increased even when a relatively thick recording sheet S is conveyed.

Preferably, a facsimile apparatus comprises a main body forming an outer surface of the facsimile apparatus, a recording unit which is constituted by providing a replaceable ink cartridge to serial recording type ink-jet recording means, and being arranged in a deep portion of the main body, a lid, which is openably provided to the upper surface of the main body, and allows replacement of the ink cartridge, an original reader arranged in an upper portion of the main body, an original insertion port for an original, which port is formed in the upper surface of the main body, a sheet discharge port for a recording sheet, which port is formed in the upper surface of the main body, an original discharge port for the original, which port is formed in a front surface of the main body, a sheet insertion port for the recording sheet, which port is formed in the front surface of the main body, an original convey path for conveying the original from the original insertion port to the original discharge port through the original reader, and a recording sheet convey path for conveying the recording sheet from the sheet insertion port to the sheet discharge port through the recording unit. The original convey path and the recording sheet convey path can be rendered compact. In addition, the ink cartridge can be easily replaced.

Other features and advantages of the present invention will be apparent from the following description taken in conjunction with the accompanying drawings,

DESCRIPTION OF THE PREFERRED EMBODIMENT

Figure 1:
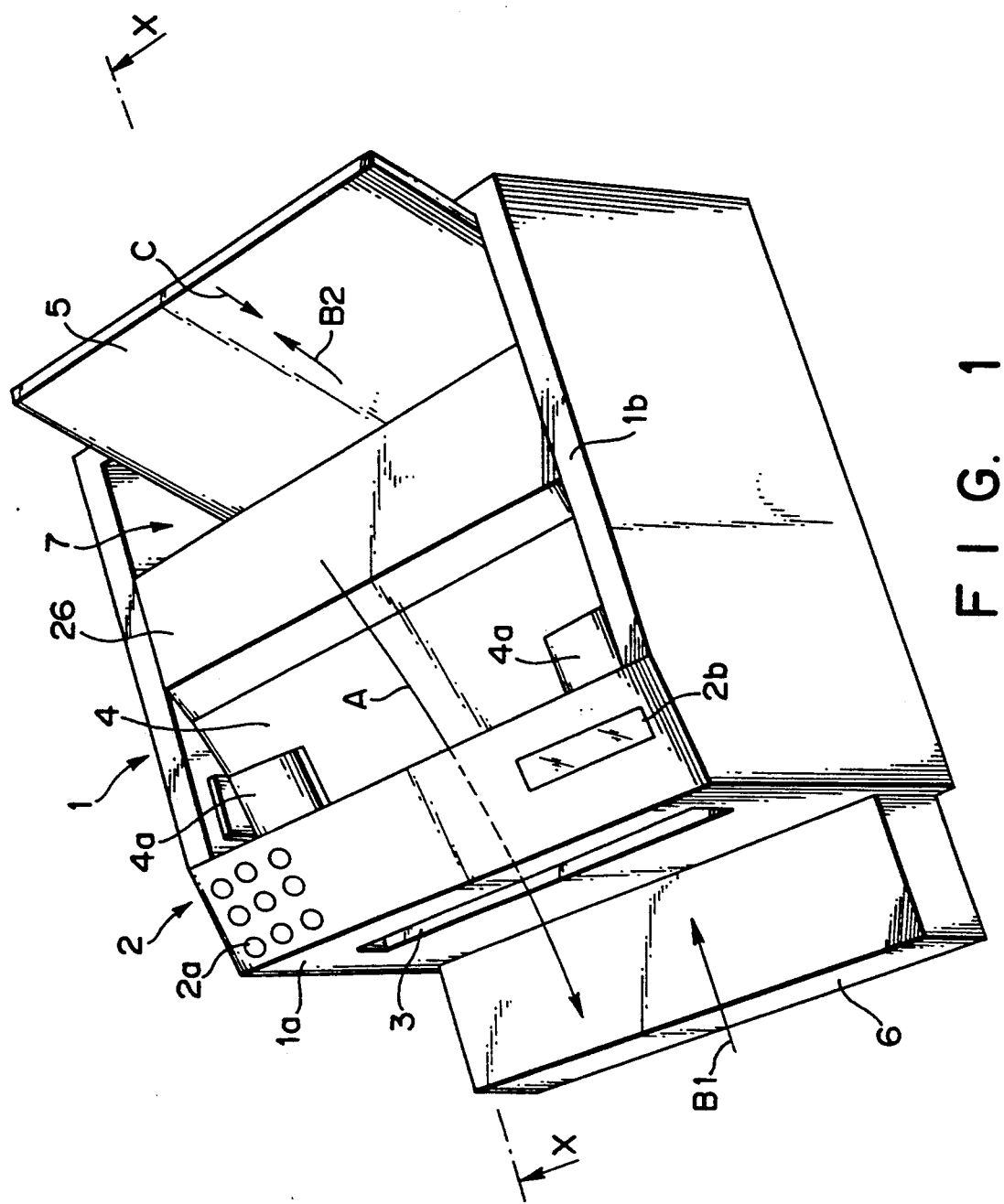
FIG. 1 is a perspective view showing the outer appearance of a facsimile apparatus according to an embodiment of the present invention.

An embodiment of the present invention will be described in detail hereinafter with reference to the accompanying drawings. FIG. 1 is a perspective view showing the outer appearance of a facsimile apparatus according to an embodiment of the present invention. In FIG. 1, a main body 1 of the facsimile apparatus is a facsimile apparatus comprising a serial recording type ink-jet recording means (to be described later). As shown in FIG. 1, an operation panel 2 is arranged near a front edge portion of an upper surface 1b of the main body 1.

An original reader (to be described later) is arranged below and behind the operation panel 2. In the original reader, a plurality of originals stacked on an original table 4 are registered by a guide 4a, , and are then moved one by one in a direction of an arrow A. Then, the original is read while being discharged toward an opening portion 3 formed in a front side surface 1a of the main body 1.

A serial recording type ink-jet recording apparatus is obliquely incorporated below and behind the original reader. A sheet cartridge 6 for supplying the recording sheet S to the ink-jet recording apparatus is detachably arranged in the lower portion of the front side surface 1a. The recording sheet S fed one by one from the sheet cartridge 6 in a direction of an arrow B1 is subjected to recording by the ink-jet recording apparatus, and thereafter, is discharged in a direction of an arrow B2 onto a tray 5 arranged on the rear portion of the upper surface 1b of the main body 1 to be inclined to the rear side.

Figure 2:
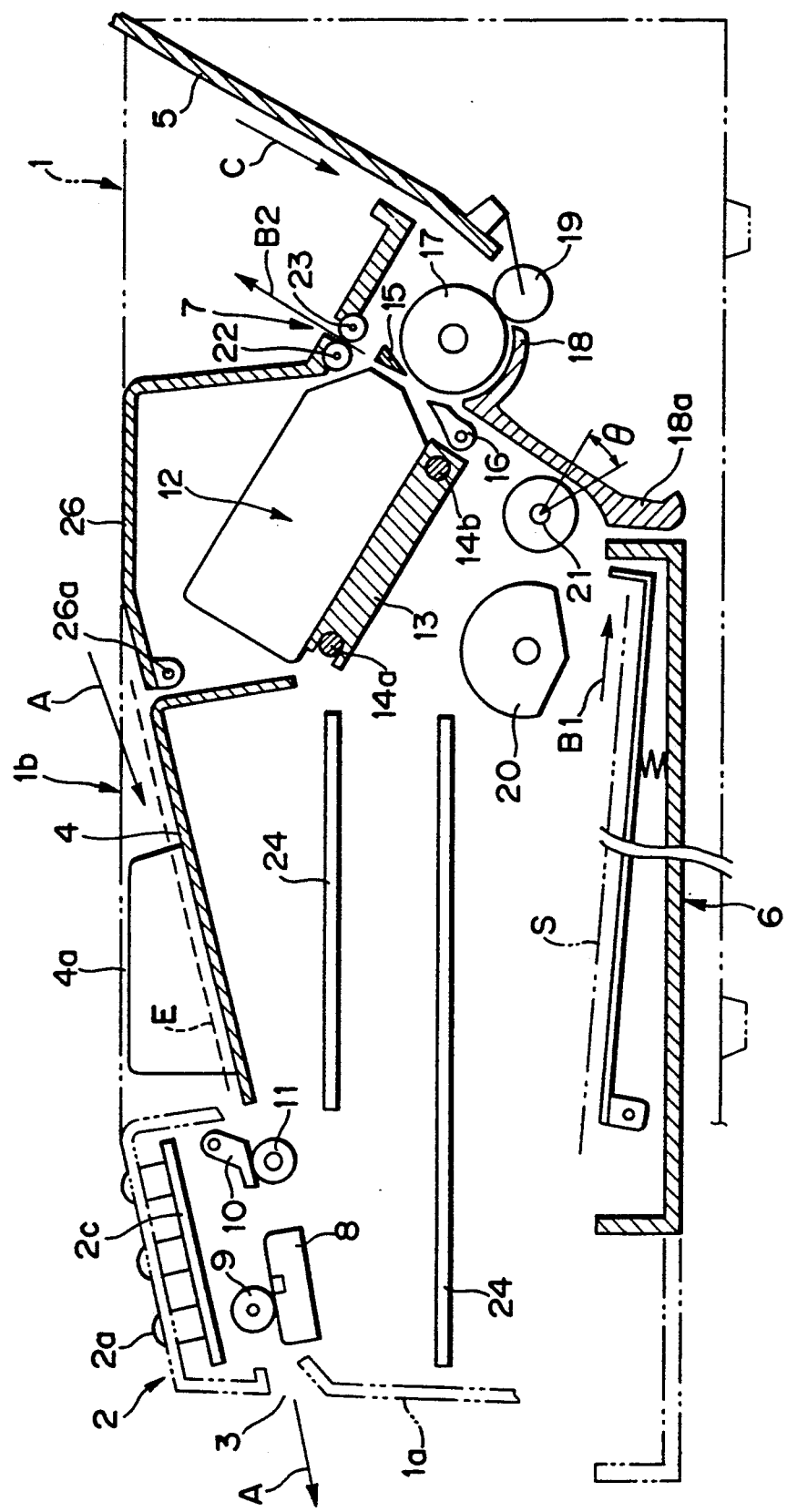
FIG. 2 is a sectional view taken along a line X—X in FIG. 1.

FIG. 2 is a sectional view taken along a line X—X in FIG. 1, and shows principal constituting elements to be incorporated. In FIG. 2, the operation panel 2 is arranged on the front edge portion of the upper surface 1b of the main body 1 indicated by an alternate long and two short dashed line in FIG. 2, and is provided with keys 2a mounted on a circuit board 2c, and a display 2b, which are exposed externally from hole portions integrally formed in the operation panel 2.

The original reader is arranged below the operation panel 2. The original reader moves an original E indicated by a broken line in FIG. 2 in the direction of the arrow A, and reads an original image while discharging the original E toward the opening portion 3 formed in the front side surface 1a of the main body 1.

The original reader is constituted by a contact sensor 8 which is brought into direct contact with the original surface of the original E to read an original image, and a feed roller 9 which is pivoted in a state wherein it is urged against a reading unit of the contact sensor 8. A separation pawl 10 and a separation feed roller 11 are arranged at the upstream side of the contact sensor 8 so that a plurality of originals placed on the original table 4 are fed one by one toward the contact sensor 8. Two layers of circuit boards 24 are arranged below the original reader.

The serial recording type ink-jet recording apparatus incorporates a carriage 13 in an inclined state, as shown in FIG. 2. With this arrangement, since a recording unit is inclined, the recording sheet S fed one by one from the sheet cartridge 6 in the direction of the arrow B1 can be prevented from being forcibly deformed.

The ink-jet recording apparatus suitably adopts a bubble ink-jet recording apparatus as the inherent technique of the present applicant, but may adopt other known ink-jet recording apparatuses. The ink-jet recording apparatus is constituted by a recording scan section for scanning to perform recording in the width-wise direction of the sheet, and a sheet feed section. The recording scan section comprises the carriage 13 which is slidably guided by guide shafts 14a and 14b so as to be reciprocally driven by a drive mechanism (not shown) in the upper/lower direction of the sheet surface, an ink cartridge 12 replaceably attached to the carriage 13 and indicated by a solid line, and a platen 15 fixed to the main body, and serving as a stationary table for the recording sheet in a recording mode. The sheet feed section comprises a rubber roller 17 driven by a drive unit (not shown) provided to the main body, a pressing piece 16, a sheet guide 18, a roller 22, which does not adversely influence recording upon being in contact with an insufficiently dried recording surface after an ink-jet recording operation, and a driving roller 17. The ink-jet recording apparatus performs recording onto the recording sheet S fed from the direction of the arrow B1, and discharges the recording sheet in the direction of the arrow B2.

The roller 22 is rotatably arranged at the edge portion of a lid 26 which is pivotally supported by a shaft 26a to be openable with respect to the main body 1. After the lid 26 is opened, the cartridge 12 can be easily replaced, and for example, a jammed sheet can also be easily removed.

A driven roller 19 is pressed against the outer circumferential surface of the above-mentioned rubber roller 17. The recording sheet fed from the tray 5 in a direction of an arrow C is guided along the sheet guide 18, and is fed to the platen 15, thus allowing recording.

A plurality of recording sheets S are stacked and stored in the sheet cartridge 6, and are fed one by one to a position between the pressing piece 16 and the rubber roller 17 by a separation feed roller 20 as a sheet separation mechanism, and a feed roller 21.

The recording sheet S is subjected to bending deformation corresponding to an angle $\theta$ by the feed roller 21. However, since the angle $\theta$ is considerably smaller than 180° corresponding to half the entire circumference, the adverse influence on the recording sheet S can be eliminated.

In the above-mentioned facsimile apparatus, in a transmission mode, the original E is fed in the direction of the arrow A, and transmission is performed. In a reception mode, the separation feed roller 20, and the like are driven to feed one recording sheet to a position between a guide portion 18a of the sheet guide 18 and the feed roller 21. After the sheet is clamped between the guide portion 18a and the feed roller 21, it is fed to a position between the pressing piece 16 and the rubber roller 17.

Thereafter, the sheet is conveyed step by step in the direction of the arrow B2 to record one line corresponding to a predetermined number of dots. Upon completion of recording for one sheet, the sheet is discharged onto the tray 5.

Figure 3:
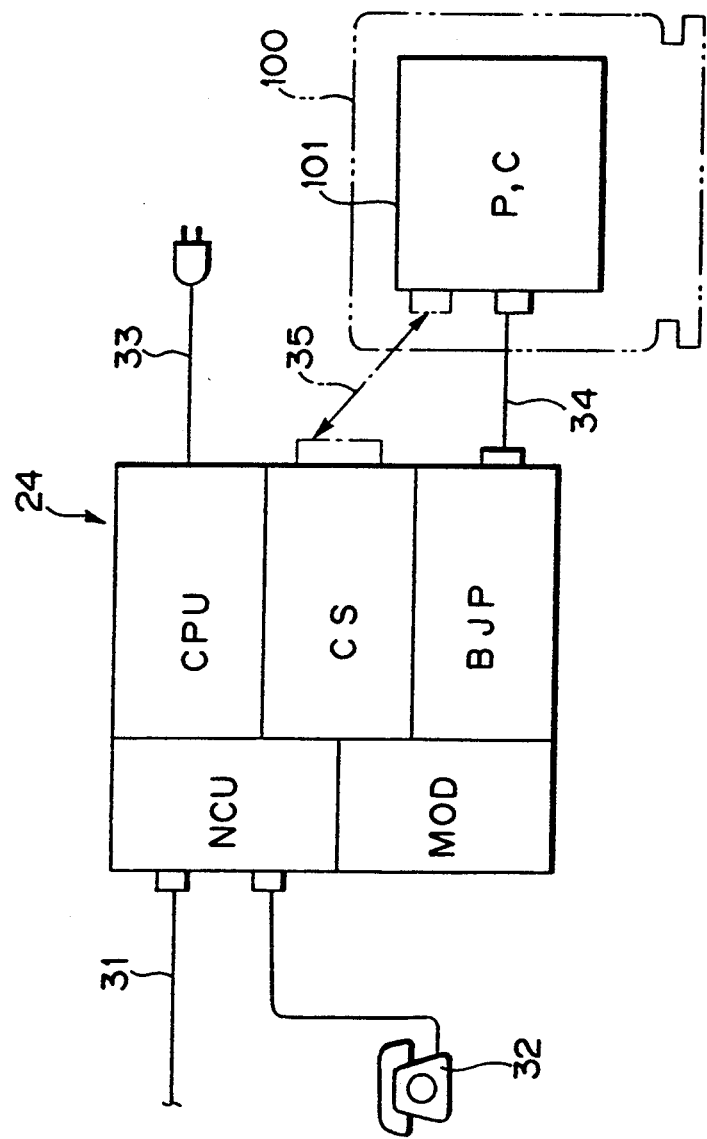
FIG. 3 is a block diagram of the facsimile apparatus shown in FIG. 1.
Figure 4:
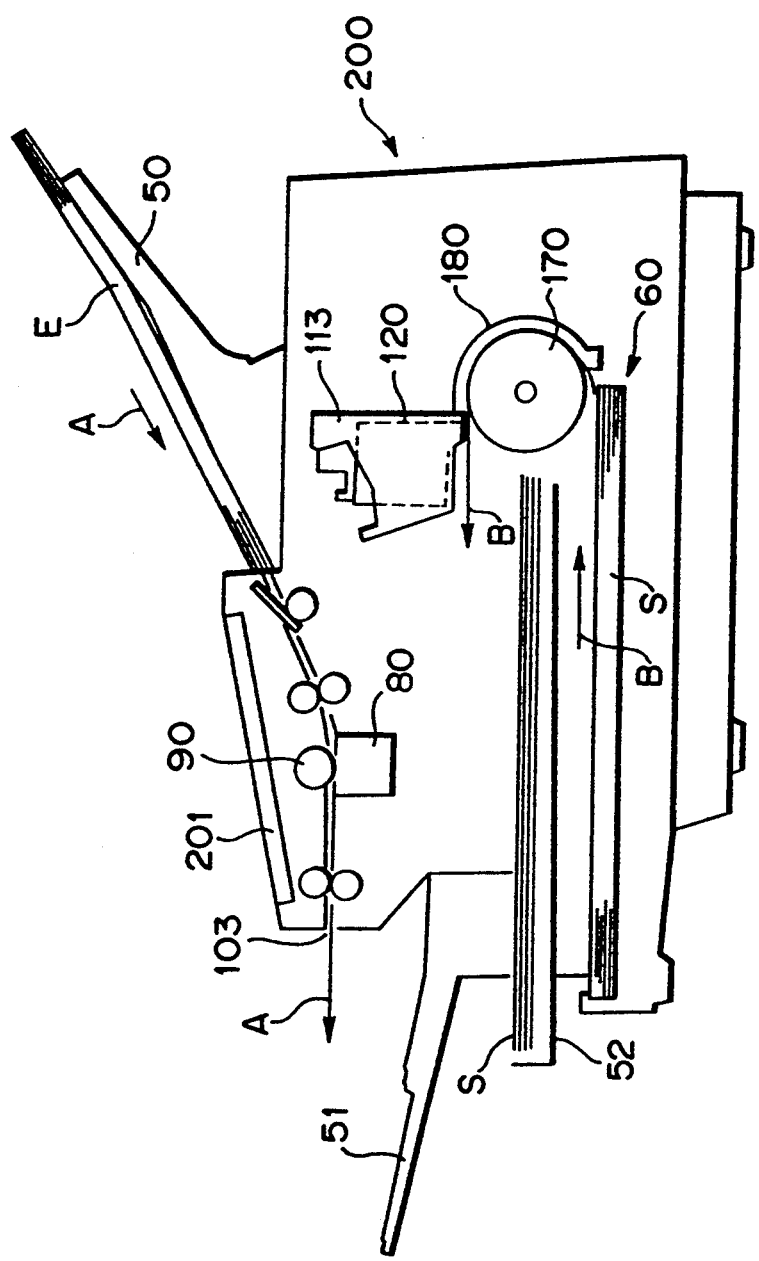
FIG. 4 is a sectional view of principal part of a conventional facsimile apparatus.

FIG. 3 is a block diagram of a circuit incorporated in the main body, and illustrates functional blocks mounted on the above-mentioned circuit boards 24. A network control unit NCU connected to a line 31 is connected to a telephone set 32, and automatically discriminates a facsimile reception mode or a telephone reception mode. The network control unit NCU is connected to a modem MOD, and exchanges predetermined signals with a main control unit CPU. The main control unit CPU is connected to the contact sensor CS (8) and an ink-jet recording unit BJP so as to read an original image and to record image data. The ink-jet recording unit BJP is directly connected to a main board 101 of a personal computer 100 through a signal line 34, so that the unit BJP can be independently used as an output terminal of the personal computer. When the ink-jet recording unit BJP is used as the output terminal of the personal computer, it is convenient to insert recording sheets one by one, as described above, since various forms can be arbitrarily set.

As indicated by a broken line in FIG. 3, a signal line 35 may be directly connected to the contact sensor CS (8), and the sensor may be used for reading an image.

As described above, according to the present invention, even when a relatively thick recording sheet S is conveyed, the load on the sheet drive mechanism can be prevented from being increased, and one recording sheet can be arbitrarily fed to the ink-jet recording apparatus. In addition, a warp or curl of the sheet can be eliminated.

Since the recording sheet and the original are conveyed effectively, a the facsimile apparatus which has a very simple mechanism required for conveying the recording sheet and the original can be provided.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for use in a facsimile apparatus comprising:
    a main body having an outer surface;
    a recording unit including a serial recording type ink-jet recording head, the recording unit being arranged in a portion of said main body;
    an original reader arranged in an upper portion of said main body;
    an original insertion port for receiving an original, said original insertion port being formed in an upper surface of said main body;
    a sheet discharge port for discharging a recording sheet, said sheet discharge port being formed in the upper surface of said main body;
    an original discharge port for discharging the original, said original discharge port being formed in a front surface of said main body;
    a sheet insertion port for receiving the recording sheet, said sheet insertion port being formed in a lower front surface of said main body;
    means for defining an original convey path for conveying the original from said original insertion port formed in the upper surface of the main body to said original discharge port formed in the front surface of the main body through a reading area adjacent said original reader; and
    means for defining a recording sheet convey path for conveying the recording sheet from said sheet insertion port formed in the lower front surface of the main body to said sheet discharge port formed in the upper surface of the main body through a recording area adjacent said recording unit, wherein an upstream portion of said means for defining said recording sheet convey path is arranged substantially horizontally, and said means for defining said recording sheet convey path is inclined halfway toward said sheet discharge port through said recording area.

2. The apparatus according to claim 1, wherein an externally operable operation unit is arranged above said recording unit, and near a front edge portion of said main body.

3. The apparatus according to claim 1, wherein said ink-jet recording head is arranged to be inclined toward a lower portion of a front surface of said main body.

4. The apparatus according to claim 1, wherein a portion of an upstream portion of said means for defining said recording sheet convey path is arranged to store a plurality of recording sheets and to be detachable from said main body, and can supply the recording sheets one by one toward said recording unit.

5. An apparatus according to claim 1, further comprising reversing means for conveying the recording sheet in a downward direction after the recording sheet is inserted from a rear recording sheet insertion port formed behind said sheet discharge port, said reversing means being further for reversing conveyance of the recording sheet in an upward direction and discharging the recording sheet, which has been reversed in an upward direction, through said recording sheet discharge port to a location outside of said main body, so that the recording sheet is conveyed from the rear recording sheet insertion port through said recording area.

6. An apparatus for use in a facsimile apparatus comprising:
    a main body having an outer surface;
    a recording unit which includes a replaceable ink cartridge and a serial recording type ink-jet recording head, said recording unit being arranged in a portion of said main body;
    an upper surface lid, which is provided on an upper surface of said main body, said upper surface lid being openable to allow replacement of said ink cartridge;
    an original reader arranged in an upper portion of said main body;
    an original insertion port for receiving an original, said original insertion port being formed in the upper surface of said main body;
    a sheet discharge port for discharging a recording sheet, said sheet discharge port being formed in the upper surface of said main body;
    an original discharge port for discharging the original, said original discharge port being formed in a front surface of said main body;
    a sheet insertion port for receiving the recording sheet, said sheet insertion port being formed in the front surface of said main body;
    means for defining an original convey path for conveying the original from said original insertion port formed in the upper surface of the main body to said original discharge port formed in the front surface of the main body through a reading area adjacent said original reader; and means for defining a recording sheet convey path for conveying the recording sheet from said sheet insertion port formed in a lower front surface of the main body to said sheet discharge port formed in the upper surface of the main body through a recording area adjacent said recording unit, wherein an upstream portion of said means for defining said recording sheet convey path is arranged substantially horizontally, and said recording sheet convey path is inclined halfway toward said sheet discharge port through said recording area.

7. The apparatus according to claim 6, wherein a circuit board is arranged below said original reader.

8. The apparatus according to claim 6, wherein said original reader comprises a contact type original reading device which has a low profile along a direction in which the original is conveyed.

9. The apparatus according to claim 6, wherein said ink-jet recording head is arranged to be inclined toward a lower portion of a front surface of said main body.

10. The apparatus according to claim 6, wherein a portion of an upstream portion of said means for defining said recording sheet convey path is arranged to store a plurality of recording sheets and to be detachable from said main body, and can supply the recording sheets one by one toward said recording unit.

11. The apparatus according to claim 6, further comprising reversing means for conveying the recording sheet inserted from a rear recording sheet insertion port formed behind said sheet discharge port toward said recording unit, reversing conveyance of the recording sheet in an upward direction, and discharging the recording sheet through said recording sheet discharge port to a location outside of said main body.

12. The apparatus according to claim 6, further comprising an original width regulating section, which is arranged midway along said means for defining said original convey path, and is adjusted in correspondence with a width of the original.

* * * * *

UNITED STATES PATENT AND TRADEMARK OFFICE
CERTIFICATE OF CORRECTION

PATENT NO. : 5,329,373
DATED : July 12, 1994
INVENTOR(S) : Toshiyuki HAYASHI, et al.

It is certified that error appears in the above-indentified patent and that said Letters Patent is hereby corrected as shown below:

On the title page:

AT [56] ATTORNEY, AGENT, OR FIRM:

"Fitzpatrick, Cella Harper & Scinto" should read --Fitzpatrick, Cella, Harper & Scinto--.

COLUMN 3:

Line 31, "4a,  , and" should read --4a, and--.

COLUMN 5:

Line 37, "the" should be deleted.

Signed and Sealed this

Fourteenth Day of February, 1995

Attest:

BRUCE LEHMAN

*Attesting Officer*  *Commissioner of Patents and Trademarks*